United States Patent
Kinsho et al.

(10) Patent No.: US 10,736,317 B2
(45) Date of Patent: Aug. 11, 2020

(54) COMPOSITION HAVING SEX PHEROMONE ACTIVITY ON SAN JOSE SCALE, AND ATTRACTANT, MATING DISRUPTANT, ATTRACTION METHOD AND MATING DISRUPTION METHOD FOR SAN JOSE SCALE

(71) Applicant: SHIN-ETSU CHEMICAL CO., LTD., Tokyo (JP)

(72) Inventors: Takeshi Kinsho, Joetsu (JP); Tatsuya Fujii, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/223,810

(22) Filed: Dec. 18, 2018

(65) Prior Publication Data

US 2019/0191698 A1  Jun. 27, 2019

(30) Foreign Application Priority Data

Dec. 26, 2017 (JP) ................................. 2017-249567

(51) Int. Cl.
*A01N 49/00* (2006.01)
*A01N 37/06* (2006.01)
*A01N 25/08* (2006.01)

(52) U.S. Cl.
CPC .............. *A01N 37/06* (2013.01); *A01N 25/08* (2013.01); *A01N 49/00* (2013.01)

(58) Field of Classification Search
None
See application file for complete search history.

(56) References Cited

U.S. PATENT DOCUMENTS 4,223,012 A   9/1980  Anderson et al.

FOREIGN PATENT DOCUMENTS

EP           3037405 A1     6/2016

OTHER PUBLICATIONS

Gieselmann et al.; "Sex Pheromone of the San Jose Scale"; Journal of Chemical Ecology, vol. 5, No. 6, pp. 891-900; revised Jan. 1979.
Anderson et al.; "Synthesis of 7-Methyl-3-Methylene-7-Octen-1-YL Propanoate and (Z)-3, 7-Dimethyl-2, 7-Octadien-1-YL Propanoate, Components of the Sex Pheromone of the San Jose Scale"; Journal of Chemical Ecology, vol. 5, No. 6, pp. 919-927; revised Apr. 1979.
Anderson et al.; "Synthesis and Identification of a Third Component of the San Jose Scale Sex Pheromone"; Journal of Chemical Ecology, vol. 7, No. 4, 1981, pp. 695-706.
Mar. 8, 2019 Extended Search Report issued in European Patent Application No. 18213849.5.
"CAS Registry No. 105-89-5: Rhodinyl Propionate". In: "Chemical Abstracts Registry Database", Nov. 16, 1984, Chemical Abstracts Service, Columbus, Ohio, U.S.A.
Steffen Arctander. "Monograph 2805: Rhodinyl Propionate". In: "Perfume and Flavor Chemicals (Aroma Chemicals)—vol. II", Jan. 1, 1994, Allured Publishing Corporation, IL, U.S.A.
Richard E. Rice et al. "Monitoring and Modeling San Jose Scale". California Agriculture, Jan. 1, 1982, pp. 13-14, URL <https://www.google.com/url?sa=t&rct=j&q=&esrc=s&source=web&cd=5&ved=2ahUKEwj0ipeXIbjgAhUHZVAKHdTfDPwQFjAEegQIAxAC&url=http://calag.ucanr.edu/archive/?type=pdf&article=ca.v036n01p13&usg=AOvVaw1qZx_zhmSeqGwS3lihllSB>.
R.E. Rice et al. "Response of San Jose Scale to Natural and Synthetic Sex Pheromones". Environmental Entomology, vol. 9, No. 2, Apr. 1, 1980, pp. 190-194.
Margot Alderdice et al. "Synthesis of the Three Isomeric Components of San Jose Scale Pheromone". Tetrahedron Letters, Elsevier, Amsterdam, NL, vol. 25, No. 16, Jan. 1, 1984, pp. 1643-1646.
Zu Zhanghuang et al. "Synthesis of the San Jose Scale's Sex Pheromone Component Using Insoluble Polymer Support". Reactive Polymers, Elsevier Science Publishers, Amsterdam, NL, vol. 10, No. 2-3, Jan. 1, 1989, pp. 315-316.
Lajos Novak et al. "A Facile Synthesis of Two Isomeric Components of San Jose Scale Pheromone". Synthesis, Oct. 1, 1985, pp. 939-941, URL: <https://www.thieme-connect.com/products/ejournals/pdf/10.10551s-1985-31392.pdf>.
Domenic A. Lombardo et al. "Photoenolisation of Conjugated Esters: Synthesis of a San Jose Scale Pheromone by Partially Regio-Controlled Photochemical Deconjugation". Tetrahedron Letters, Elsevier, Amsterdam, NL, vol. 27, No. 46, Jan. 1, 1986, pp. 5555-5558.

*Primary Examiner* — Kevin S Orwig
(74) *Attorney, Agent, or Firm* — Oliff PLC

(57) ABSTRACT

A composition containing a substance having sex pheromone activity on San Jose scale (SJS) after finding the substance. More specifically, there are provided a composition having sex pheromone activity on SJS, the composition containing 3,7-dimethyl-7-octenyl propionate as a substance having sex pheromone activity on SJS; an attractant for SJS, the attractant containing the composition and a support for supporting the composition in such a manner as to allow the substance to be released; a mating disruptant for SJS, the disruptant containing the composition and a container for storing the composition in such a manner as to allow the substance to be released; and a method for attracting SJS or disrupting mating of SJS, the method including a step of installing the attractant or the mating disruptant for SJS in a field to release the substance from the attractant or the mating disruptant into the field.

5 Claims, 1 Drawing Sheet

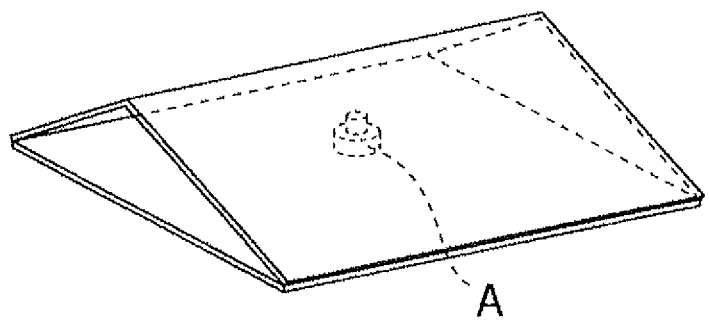

COMPOSITION HAVING SEX PHEROMONE ACTIVITY ON SAN JOSE SCALE, AND ATTRACTANT, MATING DISRUPTANT, ATTRACTION METHOD AND MATING DISRUPTION METHOD FOR SAN JOSE SCALE

BACKGROUND OF THE INVENTION

1. Field of the Invention

The invention relates to a composition having sex pheromone activity on San Jose scale, and an attractant, a mating disruptant, an attraction method and a mating disruption method for the San Jose scale.

2. Related Art

An insect sex pheromone is a biologically active substance which is typically released by a female individual to attract a male individual, and shows high attractive activity in a small amount. The sex pheromone is widely used as a means for forecasting emergence of insect pest or for ascertaining geographical spread of insect pest (insect pest invasion to a particular region), as well as a means for insect pest control. As the insect pest control, "mass trapping", "lure and kill" or "attract and kill", "lure and infect" or "attract and infect", and mating disruption are widely implemented for practical use. In use of the sex pheromone, economical production of a necessary amount of pheromone substance is required for basic researches and applications. Also conducted are searches for analogous compounds having sex pheromone activity and studies on the structure-activity relationship.

*Quadraspidiotus perniciosus* (synonyms: *Diaspidiotus perniciosus* and *Aspidiotus perniciosus*; common name: San Jose scale, hereinafter also referred to as "SJS") is an economically important insect pest which is distributed over wide areas of the world and damages fruit trees and ornamental trees, especially deciduous fruit trees. The active components of the SJS sex pheromone are identified by Gieselmann et al. (J. Chem. Ecol., 5, 891 (1979) and by Anderson et al. (J. Chem. Ecol., 5, 919 (1979)), as the following isomeric three compounds: 7-methyl-3-methylene-7-octenyl propionate, (Z)-3,7-dimethyl-2,7-octadienyl propionate, and (E)-3,7-dimethyl-2,7-octadienyl propionate.

In addition, 7-methyl-3-methylene-7-octenyl acetate, (Z)-3,7-dimethyl-2,7-octadienyl acetate and 3-methylene-7-octenyl propionate are proposed as derivatives of the SJS sex pheromone substances by Anderson et al. (J. Chem. Ecol., 7, 695 (1981)).

SUMMARY OF THE INVENTION

It is possible to synthesize the three components of the SJS sex pheromone in an industrial scale. However, there is a demand for a compound having a sex pheromone activity which can be synthesized more easily from the viewpoint of cost. It is also noted that none of the derivatives described in Anderson et al. (J. Chem. Ecol., 7, 695 (1981)) has a sex pheromone activity comparable to the natural sex pheromone.

Taking these circumstances into consideration, an object of the invention is to provide a composition having sex pheromone activity on the SJS, and an attractant, a mating disruptant, an attraction method and a mating disruption method for the SJS.

While studying the syntheses of the three compounds naturally present in the SJS, the inventors have come to think that it is industrially useful to provide an active derivative which can be synthesized more easily. Paying attention to the structures of the three compounds having similar level of attractive activities, the inventors have considered that the presence of the C=C double bond between carbons 2 and 3 may not be essential for the activity, and from the viewpoint of binding to a sex pheromone receptor and generating sex pheromone activity, the steric structure around the methyl substituent at the carbon 3 may have a high degree of freedom so that some structural modification may have little impact on the sex pheromone activity. Thus, the inventors have synthesized 3,7-dimethyl-7-octenyl propionate having the same carbon skeleton as said three compounds and having the C=C double bond between carbons 2 and 3 changed into a saturated bond, and found that the 3,7-dimethyl-7-octenyl propionate has a sex pheromone activity on the SJS.

In one aspect of the invention, there is provided a composition having sex pheromone activity on the SJS, the composition comprising 3,7-dimethyl-7-octenyl propionate as a substance having sex pheromone activity on the SJS. As used herein, the term "substance having sex pheromone activity" means a substance having an activity similar to that of the sex pheromone.

In another aspect of the invention, there is provided an attractant for the SJS, the attractant comprising the composition having sex pheromone activity, and a support for supporting the composition in such a manner as to allow the substance having sex pheromone activity in the composition to be released.

In still another aspect of the invention, there is provided a mating disruptant for the SJS, the disruptant comprising the composition having sex pheromone activity, and a container for storing the composition in such a manner as to allow the substance having sex pheromone activity in the composition to be released.

In still another aspect of the invention, there is provided a method for attracting the SJS, the method comprising a step of installing the attractant for the SJS in a field to release the substance having sex pheromone activity from the attractant into the field.

In still another aspect of the invention, there is provided a method for disrupting mating of the SJS, the method comprising a step of installing the mating disruptant for the SJS in a field to release the substance having the sex pheromone activity from the mating disruptant into the field.

According to the invention, a method for attracting the SJS or a method for disrupting mating of the SJS can be implemented by using the composition having sex pheromone activity on the SJS, the composition comprising 3,7-dimethyl-7-octenyl propionate as a substance having sex pheromone activity.

BRIEF DESCRIPTION OF THE DRAWINGS

FIG. 1 shows a white adhesive trap.

DETAILED DESCRIPTION OF THE PREFERRED EMBODIMENTS

First, there will be described in detail the composition having sex pheromone activity on the SJS, the composition comprising 3,7-dimethyl-7-octenyl propionate as a substance having sex pheromone activity on the SJS.

3,7-Dimethyl-7-octenyl propionate having sex pheromone activity on the SJS may be a racemate, which is a racemic mixture of (±)-3,7-dimethyl-7-octenyl propionate; one of the optical isomers, which is an enantiomer, (R)-3,7-dimethyl-7-octenyl propionate, or (S)-3,7-dimethyl-7-octenyl propionate; or a mixture (scalemic mixture) of optically active substances in which one of the enantiomers is present in excess over the other. The racemate is preferred from the viewpoint of economy.

The fact that the racemate has an activity means either case (1) in which one of the enantiomers (optically active substances) has an activity, or case (2) in which both of the enantiomers show activities. If case (1) is applicable, it is considered that the other enantiomer is inactive or does not have inhibitory activity enough to offset the activity of said enantiomer having the activity.

3,7-Dimethyl-7-octenyl propionate may be obtained by esterification of commercially available 3,7-dimethyl-7-octenol. However, the commercially available 3,7-dimethyl-7-octenol which is used as fragrance or others may not always be a racemate. It may be a mixture (scalemic mixture) of optically active substances in which one of the enantiomers is present in excess over the other, or a mixture containing an impurity such as geraniol (3,7-dimethyl-2,6-octadienol) or 3,7-dimethyl-6-octanol. Therefore, it is preferable to synthesize 3,7-dimethyl-7-octenol and use it as an intermediate for the synthesis of 3,7-dimethyl-7-octenyl propionate.

As an example of syntheses of 3,7-dimethyl-7-octenol, there is a method comprising steps of: subjecting 3-methyl-3-butenyl magnesium chloride to a coupling reaction with 1-bromo-3-chloro-2-methylpropane in the presence of a copper catalyst to obtain 2,6-dimethyl-6-heptenyl chloride; and reacting a Grignard reagent of the 2,6-dimethyl-6-heptenyl chloride with formaldehyde or a formaldehyde equivalent such as paraformaldehyde or 1,3,5-trioxane to obtain 3,7-dimethyl-7-octenol.

The content of 3,7-dimethyl-7-octenyl propionate in the composition having sex pheromone activity may be preferably from 0.0001 to 100% by weight (further preferably from 0.0001 to 99% by weight), more preferably from 0.001 to 100% by weight, still more preferably from 40 to 100% by weight, and particularly preferably 70-100% by weight. Alternatively, it may be further preferably from 5 to 95% by weight.

The composition having sex pheromone activity may comprise, in addition to 3,7-dimethyl-7-octenol as the substance having a sex pheromone activity, at least one selected from the group consisting of 7-methyl-3-methylene-7-octenyl propionate, (Z)-3,7-dimethyl-2,7-octadienyl propionate and (E)-3,7-dimethyl-2,7-octadienyl propionate, which are three natural sex pheromone substances of the SJS (hereinafter also referred to as "three sex pheromone compounds"). The three sex pheromone compounds may be natural products, but preferably synthetic products from the viewpoint of the costs.

When all of the three sex pheromone compounds are used, the weight ratio of 7-methyl-3-methylene-7-octenyl propionate, (Z)-3,7-dimethyl-2,7-octadienyl propionate and (E)-3,7-dimethyl-2,7-octadienyl propionate may be any weight ratio because there is no difference between their sex pheromone activities. The weight ratio is preferably (from 28 to 94):(from 2 to 67):(from 4 to 25) with the proviso that the total is equal to 100. From the viewpoint of possible development of resistance, and the natural compositional ratio reported by Anderson et al. (J. Chem. Ecol., 7, 695 (1981)), the weight ratio is preferably (from 28 to 68):(from 27 to 67):(from 5-25) and more preferably (from 38 to 58):(from 37 to 57):(from 5 to 15), with the proviso that the total is equal to 100.

The content of at least one selected from the groups consisting of the three sex pheromone compounds in the composition having sex pheromone activity is preferably from 1 to 1,000 parts by weight, more preferably from 10 to 500 parts by weight, and particularly preferably from 50 to 150 parts by weight, relative to 100 parts by weight of 3,7-dimethyl-7-octenyl propionate, from the viewpoint of economy.

Further, the composition having sex pheromone activity may additionally comprise an additive which includes a stabilizer such as 2,6-di-tert-butyl-4-methylphenol (BHT); an antioxidant such as butylhydroxytoluene, butylhydroxyanisole, hydroquinone and vitamin E; and a UV absorber such as 2-hydroxy-4-octoxybenzophenone, and 2-(2'-hydroxy-3'-tert-butyl-5'-methylphenyl)-5-chlorobenzotriazole.

Regarding the content of the additive in the composition having sex pheromone activity, for example, the stabilizer may be preferably in an amount of from 1 to 15 parts by weight, the antioxidant may be preferably in an amount of from 1 to 15 parts by weight, and the UV absorber is preferably in an amount of from 1 to 15 parts by weight, relative to 100 parts by weight of 3,7-dimethyl-7-octenyl propionate.

Next, the attractant for the SJS will be described in detail, the attractant comprising the composition having sex pheromone activity, and a support for supporting the composition in such a manner as to allow the substance having the sex pheromone activity in the composition to be released.

The support may be any support which can stably hold the composition having sex pheromone activity and can release at least the substance having sex pheromone activity in a certain period of time. Examples of the support include a septum, a cap and a mineral.

The support may be made of any material which allows at least the substance having sex pheromone activity to be sustainedly released. The support is desirably made of a polymer.

The polymer may be any polymer which allows the substance having sex pheromone activity to permeate therethrough so as to release the substance outside of the polymer membrane at an appropriate rate. Examples of the polymer include natural rubbers such as cis-polyisoprene; synthetic rubbers such as isoprene rubber or butadiene rubber; polyolefins such as polyethylene and polypropylene; a copolymer containing at least 80% by weight of ethylene units such as an ethylene-vinyl acetate copolymer and an ethylene-acrylate ester copolymer; a biodegradable polyester; and polyvinyl chloride.

The amount of the composition having sex pheromone activity to be loaded on the support may differ depending on the application manner or amount. It preferably ranges from 10 μg to 100 g, and more preferably from 10 μg to 100 mg per preparation.

The attractant comprising the support may be prepared by a well-known method in the art, for example, by a method in which the composition having sex pheromone activity is kneaded into the support, or by a method in which the support is impregnated with the composition having sex pheromone activity.

Next, the mating disruptant for the SJS will be described in detail, the mating disruptant comprising the composition having sex pheromone activity, and a container for storing the composition in such a manner as to allow the substance having sex pheromone activity in the composition to be released.

The container may be any container which can stably hold the composition having the sex pheromone activity and can release at least the substance having sex pheromone activity in a certain period of time. Examples of the container include a tube, a laminate bag, a capsule, a can, and an ampoule.

A mating disruptant comprising a tubular container would be most suitable because of a prolonged and uniform release of 3,7-dimethyl-7-octenyl propionate. The tubular container preferably has an inner diameter of from 0.5 to 2.0 mm and a thickness of from 0.2 to 1.0 mm, in view of sustained release at an appropriate rate.

When the number of the release places is decreased while keeping the dosage amount per unit area unchanged, it is preferable to change the length of the mating disruptant comprising a tubular container without changing the loading amount per unit length of the mating disruptant. The length is preferably from 0.1 to 100 meters, more preferably from 0.1 to 20 meters, and still more preferably from 0.2 to 10 meters, with the proviso that two or more mating disruptants, each containing a tubular container, are not arranged in parallel.

The container of the mating disruptant may be made of any material which allows at least the substance having the sex pheromone activity to be sustainedly released. The container is desirably made of a polymer. Examples of the polymer include the above-mentioned examples of the polymer for the support.

Regarding the mating disruptant comprising a tubular container, the amount of the composition having sex pheromone activity to be loaded in each mating disruptant is preferably from 150 mg to 3.5 g per meter of the tubular container.

The mating disruptant comprising the container may be produced by a well-known method in the art, for example, by a method comprising steps of: injecting the composition having the sex pheromone activity into the container and sealing the container into which the composition has been injected.

Next, the method for attracting SJS will be described in detail, the method comprising a step of installing the attractant for the SJS in a field to release the substance having sex pheromone activity from the attractant into the field.

The number of the installation places of the attractants in a field is not particularly limited. For example, the attractants are uniformly distributed in the field to be treated, at an installation density of preferably from 0.1 to 100 places/ha, more preferably from 1 to 50 places/ha.

The period of time in which the substance having sex pheromone activity on the SJS will be released from the composition into the field is not particularly limited insofar as the insect pest can be attracted.

The release amount of the substance having sex pheromone activity from a single releasing place may vary depending on conditions such as the field environment and weather conditions. It is preferably in the range of from 0.01 to 100 µg/day/ha.

Examples of the insect pest control utilizing the SJS attraction include "mass trapping", "lure and kill" or "attract and kill", and "lure and infect" or "attract and infect".

Next, the method for disrupting mating of the SJS will be described in detail, the method comprising a step of installing the mating disruptant for the SJS in a field to release the substance having sex pheromone activity from the mating disruptant into the field.

The number of the installation places of the mating disruptants in a field is not particularly limited. For example, the mating disruptants are uniformly distributed in the field to be treated, at an installation density of preferably from 1 to 10,000 places/ha, more preferably from 1 to 1,000 places/ha.

The period of time in which the substance having sex pheromone activity on the SJS will be released from the composition into the field is not particularly limited insofar as the insect pest can be attracted.

The release amount of the substance having sex pheromone activity from a single releasing place may vary depending on conditions such as the field environment and weather conditions, and is not particularly limited as long as the substance having sex pheromone activity is uniformly diffused over the field. It is preferably in the range of from 0.01 to 20 g/day/ha.

As described above, the composition having sex pheromone activity on the San Jose scale, and the attractant, the mating disruptant, the attraction method and the mating disruption method for the San Jose scale are provided.

EXAMPLES

The invention is further described with reference to the following Synthesis Examples, Examples and Comparative Examples. It should not be construed that the invention is limited to or by them.

The purities of materials (e.g. reactants), products and intermediates are obtained by gas chromatography (GC) analyses, and expressed as % GC. The GC conditions were as follows:
GC: Shimadzu GC-14A,
column: 5% Ph-Me silicone 0.25 mmϕ×25 m,
carrier gas: He, and
detector: FID.

Taking the purities (GC %) of materials and products into consideration, the yield is expressed as the following converted yield.

Converted yield (%)=[(weight of product obtained by reaction×% GC)/(molecular weight of product)]/[(weight of reactant×% GC)/(molecular weight of reactant)]×100

If necessary, a crude product was purified to obtain a sample compound for spectrum analyses.

Synthesis Example 1: Synthesis of 2,6-dimethyl-6-heptenyl chloride

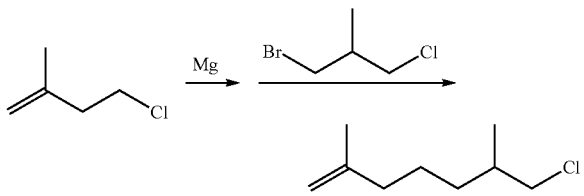

A solution of a Grignard reagent: 3-methyl-3-butenyl magnesium chloride in tetrahydrofuran was prepared from 441 g of 3-methyl-3-butenyl chloride (99.6% GC), 600 ml of tetrahydrofuran and 102 g of magnesium under a nitrogen atmosphere. The Grignard reagent solution was dropwise added to an ice-cooled mixture of 500 g of 1-bromo-3-chloro-2-methylpropane (99.9% GC), 5.85 g of copper (I) iodide, 11.8 g of triethyl phosphite and 350 ml of tetrahydrofuran with stirring under a nitrogen atmosphere over 3 hours, while keeping the reaction mixture at 20° C. or less. The reaction mixture was further stirred for 40 minutes, while cooled on ice, and then subjected to the addition of a saturated aqueous ammonium chloride solution to terminate the reaction. The organic phase was separated and then subjected to work-up including conventional washing, drying and concentration to obtain a crude product. The crude product was distilled under vacuum to obtain 419 g of the target 2,6-dimethyl-6-heptenyl chloride (purity: up to 99.0% GC, converted yield including low-purity initial distillate: 90%).

2,6-dimethyl-6-heptenyl chloride

Yellowish oil
Boiling point: 64° C./800 Pa
IR (D-ATR): θ=3074, 2966, 2935, 2860, 1650, 1458, 887 cm$^{-1}$.
$^1$H-NMR (500 MHz, CDCl$_3$): δ=1.01 (3H, d, J=6.5 Hz), 1.15-1.27 (1H, m), 1.39-1.52 (3H, m), 1.71 (3H, s), 1.78-1.88 (1H, m), 2.01 (2H, br. t-like, J=~6 Hz), 3.41 (1H, dd, J=6.1, 10.7 Hz), 3.48 (1H, dd, J=5.3, 10.7 Hz), 4.67 (1H, br. s-like), 4.71 (1H, br. s-like) ppm.
$^{13}$C-NMR (125 MHz, CDCl$_3$): δ=17.75, 22.30, 24.75, 33.52, 35.43, 37.79, 51.14, 109.92, 145.68 ppm.
GC-MS (EI, 70 eV): 41, 56 (base peak), 69, 81, 95, 109, 124, 134, 145, 160 (M$^+$).

Synthesis Example 2: Synthesis of
3,7-dimethyl-7-octenol

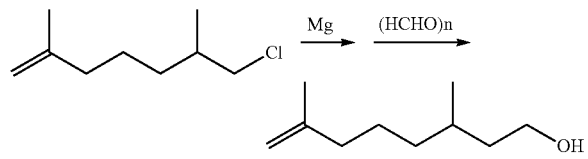

A solution of a Grignard reagent: 2,6-dimethyl-6-heptenyl magnesium chloride in tetrahydrofuran was prepared from 250 g of 2,6-dimethyl-6-heptenyl chloride (99.6% GC), 800 ml of tetrahydrofuran and 37.8 g of magnesium under a nitrogen atmosphere. This Grignard reagent solution was refluxed with stirring under a nitrogen atmosphere, and subjected to the dropwise addition of a mixture (suspension) of 60 g of paraldehyde and 300 ml of tetrahydrofuran over 4 hours. After the completion of the dropwise addition, the reaction mixture was cooled to a room temperature and allowed to stand for 14 hours. Then the reaction mixture was refluxed again with stirring for 30 minutes. The reaction mixture was cooled by ice and subjected to the addition of a sufficient amount of a saturated aqueous ammonium chloride solution to terminate the reaction. The organic phase was separated and then subjected to work-up including conventional washing, drying and concentration to obtain 237 g of a crude product of the target 3,7-dimethyl-7-octenol (purity: 82.7% GC, yield: 81%). A portion of the crude product was purified by silica-gel column chromatography to obtain a sample having purity of 99.9% GC for spectrum analyses.

3,7-dimethyl-7-octenol

Colorless oil
Boiling point: 71° C./533 Pa
IR (D-AFR): ν=3329 (br.), 3073, 2931, 2872, 1650, 1456, 1365, 1057, 886 cm$^{-1}$.
$^1$H-NMR (500 MHz, CDCl$_3$): δ=0.88 (3H, d, J=6.7 Hz), 1.09-1.17 (1H, m), 1.25-1.34 (1H, m), 1.34-1.51 (3H, m), 1.64 (1H, s), 1.69 (3H, s), 1.98 (2H, br. t-like, J=~7 Hz), 3.61-3.71 (2H, m), 4.65 (1H, br. s-like), 4.68 (1H, br. s-like) ppm.
$^{13}$C-NMR (125 MHz, CDCl$_3$): δ=19.55, 22.30, 24.83, 29.34, 36.63, 37.95, 39.86, 61.07, 109.64, 146.07 ppm.
GC-MS (EI, 70 eV): 41, 55 (base peak), 67, 81, 95, 109, 123, 138, 156 (M$^+$).
GC-MS (CI, isobutane): 83, 97, 139, 157 [(M+1)$^+$, base peak].

Synthesis Example 3: Synthesis of
3,7-dimethyl-7-octenyl propionate

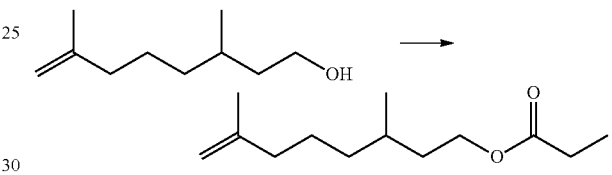

Under a nitrogen atmosphere, a mixture of 236 g of 3,7-dimethyl-7-octenol (purity: 82.7% GC), 275 g of pyridine and 400 ml of toluene was subjected to the dropwise addition of 153 g of propionyl chloride with stirring over 45 minutes. The reaction mixture was allowed to stand for 2 days at room temperature. Then the reaction mixture was cooled by ice with stirring again, and subjected to the addition of a saturated aqueous ammonium chloride solution to terminate the reaction. The organic phase was separated and then subjected to work-up including conventional washing, drying and concentration to obtain 353 g of a crude product of the target 3,7-dimethyl-7-octenyl propionate (purity: 68.0% GC, yield: 90%). The crude product was distilled under vacuum to obtain 289 g of the target 3,7-dimethyl-7-octenyl propionate (purity: up to 98.9% GC, converted yield including low-purity initial distillate: 86%).

3,7-dimethyl-7-octenyl propionate

Colorless oil
Boiling point: 109° C./800 Pa
IR (D-ATR): ν=3329 (br.), 3073, 2933, 1740, 1650, 1463, 1351, 1187, 1083, 886 cm$^{-1}$.
$^1$H-NMR (500 MHz, CDCl$_3$): δ=0.90 (3H, d, J=6.7 Hz), 1.10-1.18 (1H, m), 1.23 (3H, t, J=7.5 Hz), 1.25-1.34 (1H, m), 1.35-1.50 (3H, m), 1.50-1.59 (1H, m), 1.61-1.69 (1H, m) 1.70 (3H, s), 1.97 (2H, br. t-like, J=~7 Hz), 2.30 (2H, q, J=7.5 Hz), 4.05-4.14 (2H, m), 4.65 (1H, br. s-like), 4.68 (1H, br. s-like) ppm.
$^{13}$C-NMR (125 MHz, CDCl$_3$): δ=9.12, 19.46, 22.30, 24.80, 27.61, 29.72, 35.48, 36.41, 37.92, 62.82, 109.72, 145.95, 174.54 ppm.
GC-MS (EI, 70 eV): 41, 57 (base peak), 69, 81, 95, 109, 123, 138, 157.
GC-MS (CI, isobutane): 83, 139 (base peak), 213 [(M+1)$^+$].

<Production of SJS Attractants>

Example 1

Attractant A was produced by impregnating an isoprene rubber septum with 100 μg of 3,7-dimethyl-7-octenyl propionate.

Comparative Example 1

Attractant B was produced in the same manner as in Example 1 by impregnating an isoprene rubber septum with 100 μg of 7-methyl-3-methylene-7-octenyl propionate.

Comparative Example 2

Attractant C was produced in the same manner as in Example 1 by impregnating an isoprene rubber septum with 100 μg of (Z)-3,7-dimethyl-2,7-octadienyl propionate.

Comparative Example 3

Attractant D was produced in the same manner as in Example 1 by impregnating an isoprene rubber septum with 100 μg of (E)-3,7-dimethyl-2,7-octadienyl propionate.

Comparative Example 4

Attractant E was produced by mixing 7-methyl-3-methylene-7-octenyl propionate, (Z)-3,7-dimethyl-2,7-octadienyl propionate and (E)-3,7-dimethyl-2,7-octadienyl propionate at a weight ratio of 50:45:5, which is approximately equal to that of the natural sex pheromone composition of the SJS, and impregnating an isoprene rubber septum with 100 μg of the resulting mixture in the same manner as in Example 1.

Comparative Example 5

An isoprene rubber septum which had not been impregnated with any of 3,7-dimethyl-7-octenyl propionate, 7-methyl-3-methylene-7-octenyl propionate, (Z)-3,7-dimethyl-2,7-octadienyl propionate and (E)-3,7-dimethyl-2,7-octadienyl propionate, was designated as attractant F.

<Production of SJS Mating Disruptors>

Example 2

A mixture of 3,7-dimethyl-7-octenyl propionate, 7-methyl-3-methylene-7-octenyl propionate, (Z)-3,7-dimethyl-2,7-octadienyl propionate and (E)-3,7-dimethyl-2,7-octadienyl propionate at a weight ratio of 50:47:1:2 was prepared. The mixture was further mixed with 2,6-di-tert-butyl-4-methylphenol and 2-(2'-hydroxy-3'-tert-butyl-5'-methylphenyl)-5-chlorobenzotriazole at a weight ratio of 96:2:2 to produce a composition having sex pheromone activity on the SJS.

Mating disruptant A was produced by feeding 180 mg of this composition into a tubular polyethylene container having an inner diameter of 1.18 mm, a thickness of 0.65 mm and a length of 20 cm.

Comparative Example 6

A mixture of 7-methyl-3-methylene-7-octenyl propionate, (Z)-3,7-dimethyl-2,7-octadienyl propionate and (E)-3,7-dimethyl-2,7-octadienyl propionate at a weight ratio of 94:2:4 was prepared. The mixture was further mixed with 2,6-di-tert-butyl-4-methylphenol and 2-(2'-hydroxy-3'-tert-butyl-5'-methylphenyl)-5-chlorobenzotriazole at a weight ratio of 96:2:2 to produce a composition having sex pheromone activity on the SJS.

Mating disruptor B was produced by feeding 180 mg of this composition into a tubular polyethylene container having an inner diameter of 1.18 mm, a thickness of 0.65 mm and a length of 20 cm.

<Evaluation of Sex Pheromone Activity (SJS Attraction Test)>

A white adhesive trap was used for evaluation of the sex pheromone activity. As shown in FIG. 1, the white adhesive trap comprises a roof and a bottom plate, thereby forming narrow entrances for insects. An adhesive material was applied over the bottom plate, and the attractant, which is shown as "A" in FIG. 1, was placed directly on the adhesive surface. In other words, it is configured to capture only insects that have approached the attractant, whereby keeping unintentional admission of insects as low as possible.

In a period of from Jun. 30 to Oct. 2, 2015, the traps, each having one of the attractants, were placed in an orchard where SJS had inhabited. The number of male adult insects captured in each trap was measured for every 7 days. At every measurement, the installation places of the respective traps were changed by rotation of 13 places in total, in order to minimize the effects of installation environment on the number of capture.

The number of male adult insects captured in each trap is shown in Table 1.

TABLE 1

| | attractant | number of captured adults/trap/ seven days average ± standard deviation |
|---|---|---|
| Example 3 | A | 8.43 ± 2.15 |
| Comparative Example 7 | B | 5.64 ± 1.28 |
| Comparative Example 8 | C | 6.29 ± 1.42 |
| Comparative Example 9 | D | 19.29 ± 10.02 |
| Comparative Example 10 | E | 8.86 ± 2.73 |
| Comparative Example 11 | F | 0.36 ± 0.29 |

The number of SJS male adults captured by attractant A of Example 3 was almost the same as those captured by attractants B to E of Comparative Examples 7-10, whereas almost no insect was captured by attractant F of Comparative Example 11. It is evident from these results that 3,7-dimethyl-7-octenyl propionate has a sex pheromone activity on the SJS.

<SJS Mating Disruption Test 1>

On Sep. 4, 2017, sex pheromone traps were placed in two 5-are pear fields at a density of one trap per 5 ares, and the number of SJS male adults captured in the traps was counted for every 5 to 7 days. After confirming that SJS adults were captured in both fields, tubes of the above-mentioned mating disruptant A were uniformly installed in one of the pear fields as a treatment area at density of 100 tubes per 10 ares on September 11 (in Example 4). The other pear field was used as a control area without the mating disruptant installed (in Comparative Example 12).

The number of SJS adults captured in each of the pear fields in the period of from Sep. 11 to Oct. 6, 2017, is shown in Table 2.

TABLE 2

| | mating disruptant | number of captured adults |
|---|---|---|
| Example 4 | A | 3 |
| Comparative Example 12 | none | 11 |

The number of capture was 3 in the area treated with the mating disruptant in Example 4, whereas the number of capture was 11 in the area without the mating disruptant in Comparative Example 12. Accordingly, it is confirmed that the composition having sex pheromone activity on the SJS comprising 3,7-dimethyl-7-octenyl propionate as a substance having the sex pheromone activity substance has a mating disruption effect on the SJS.

<SJS Mating Disruption Test 2>

On May 12, 2017, tubes of mating disruptant A were uniformly installed in a 10-are apple field as a treatment area at density of 100 tubes per 10 ares (in Example 5). Tubes of mating disruptant B were uniformly installed in another 10-are apple field as a treatment area at density of 100 tubes per 10 ares (in Comparative Example 13). Still another apple field was used as a control area without a mating disruptant installed (in Comparative Example 14).

On June 22, an adhesive tape of a size 1.8 cm×10.0 cm was placed on each of 20 branches which were arbitrarily selected in each area. On July 13, the adhesive tapes were collected from each area, and classified into five levels based on the area percentage occupied by SJS larvae on the adhesive tape according to the criteria shown below. Three adhesive tapes of level 2, seven adhesive tapes of level 3 and ten adhesive tapes of level 4 were found so that the larva density level of the first generation was 67 as calculated according to the calculation formula shown below.

On August 13, an adhesive tape of a size 1.8 cm×10.0 cm was placed on each of the same 20 branches. On August 30, the adhesive tapes were collected and classified in the same manner. Seventeen adhesive tapes of level 2 and three adhesive tapes of level 3 were found so that the larva density level of the second generation was 43.

In Comparative Examples 13 and 14 as well, larva density levels of the first and second generations were determined in the same manner as described above for Example 5.

The mating disruption effect in each field was evaluated by the relative value of the first-generation larva density level relative to the second-generation larva density level.

The results are shown in Table 3.

<Criteria for Number of Larvae>

Level 1: 0% of the area of the adhesive tape
Level 2: from more than 0% to less than 10% of the area of the adhesive tape
Level 3: from 10% or more to less than 30% of the area of the adhesive tape
Level 4: from 30% or more to less than 50% of the area of the adhesive tape
Level 5: more than 50% of the area of the adhesive tape <Calculation of Larvae Density Level>

Sum of (level×number of adhesive tapes at that level)

TABLE 3

| | mating disruptant | larva density level (relative value) |
|---|---|---|
| Example 5 | A | 64 |
| Comparative Example 13 | B | 85 |
| Comparative Example 14 | none | 118 |

As compared with the larva density level (relative value) in the field of Comparative Example 14, the larvae density level (relative value) in the field of Example 5 was decreased in the same manner as in the field of Comparative Example 13. Accordingly, it is confirmed that a composition having sex pheromone activity on the SJS comprising 3,7-dimethyl-7-octenyl propionate as the substance having the sex pheromone activity has mating disruption effect on the SJS.

The invention claimed is:

1. A composition having sex pheromone activity on San Jose scale, the composition comprising 3,7-dimethyl-7-octenyl propionate, which has the following structure:

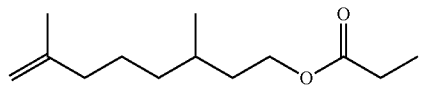

as a substance having the sex pheromone activity on San Jose scale, and at least one selected from the group consisting of 7-methyl-3-methylene-7-octenyl propionate, (Z)-3,7-dimethyl-2,7-octadienyl propionate and (E)-3,7-dimethyl-2,7-octadienyl propionate.

2. An attractant for San Jose scale, the attractant comprising:
   the composition having sex pheromone activity according to claim 1, and
   a support for supporting the composition in such a manner as to allow the substance having sex pheromone activity in the composition to be released.

3. A mating disruptant for San Jose scale, the mating disruptant comprising: the composition having sex pheromone activity according to claim 1, and a container for storing the composition in such a manner as to allow the substance having sex pheromone activity in the composition to be released.

4. A method for attracting San Jose scale, comprising a step of installing the attractant for San Jose scale according to claim 2 in a field to release the substance having sex pheromone activity from the attractant into the field.

5. A method for disrupting mating of San Jose scale, the method comprising a step of installing the mating disruptant for San Jose scale according to claim 3 in a field to release the substance having sex pheromone activity from the mating disruptant into the field.

* * * * *